(12) United States Patent
Wright et al.

(10) Patent No.: US 12,552,441 B1
(45) Date of Patent: Feb. 17, 2026

(54) MANUAL STEERING TOOL FOR A VEHICLE

(71) Applicant: Zoox, Inc., Foster City, CA (US)

(72) Inventors: Maclean Henry Arlington Wright, Belmont, CA (US); Fayed Jamal Ali, San Bruno, CA (US); Roberto Dlacic, Foster City, CA (US); Elisa Aurora Ravelo, San Francisco, CA (US); Nathan Stewart Stariha, San Gregorio, CA (US)

(*) Notice: Subject to any disclaimer, the term of this patent is extended or adjusted under 35 U.S.C. 154(b) by 150 days.

(21) Appl. No.: 18/395,307

(22) Filed: Dec. 22, 2023

(51) Int. Cl.
*B62D 1/12* (2006.01)
(52) U.S. Cl.
CPC ..................................... *B62D 1/12* (2013.01)
(58) Field of Classification Search
CPC .......................................................... B62D 1/12
See application file for complete search history.

(56) References Cited

PUBLICATIONS

54mm ⅜ Drive Hub Axle Nut Tube Spanner Socket Tool (publicly available at the URL shown on the attached reference) (Year: 2021).*

* cited by examiner

*Primary Examiner* — Randell J Krug
(74) *Attorney, Agent, or Firm* — Lee & Hayes, P.C.

(57) ABSTRACT

A manual steering tool is configured for selective attachment to a wheel of a vehicle. The tool includes a hub, a coupler for securing the hub to the vehicle, and an elongate arm extending from the hub away from the vehicle. Application of force on elongate arm at a position away from the vehicle causes the wheel and an axis of rotation of the wheel to pivot relative to the vehicle, thereby steering the wheel and the vehicle.

20 Claims, 6 Drawing Sheets

//www.w3.org/1998/Math/MathML
MANUAL STEERING TOOL FOR A VEHICLE

BACKGROUND

As vehicles advance, manual functionality is increasingly supplemented or replaced with automatic controls. Semi-autonomous vehicles may assist a driver with some functionalities, e.g., collision avoidance and braking, while fully-autonomous vehicles may reduce all passengers to passive participants as they are shuttled to their destination. This increased automation may make tasks common to conventional vehicles more difficult. For example, the absence of a steering wheel in some implementations may make navigating the vehicle more difficult.

DETAILED DESCRIPTION

Figure 1:
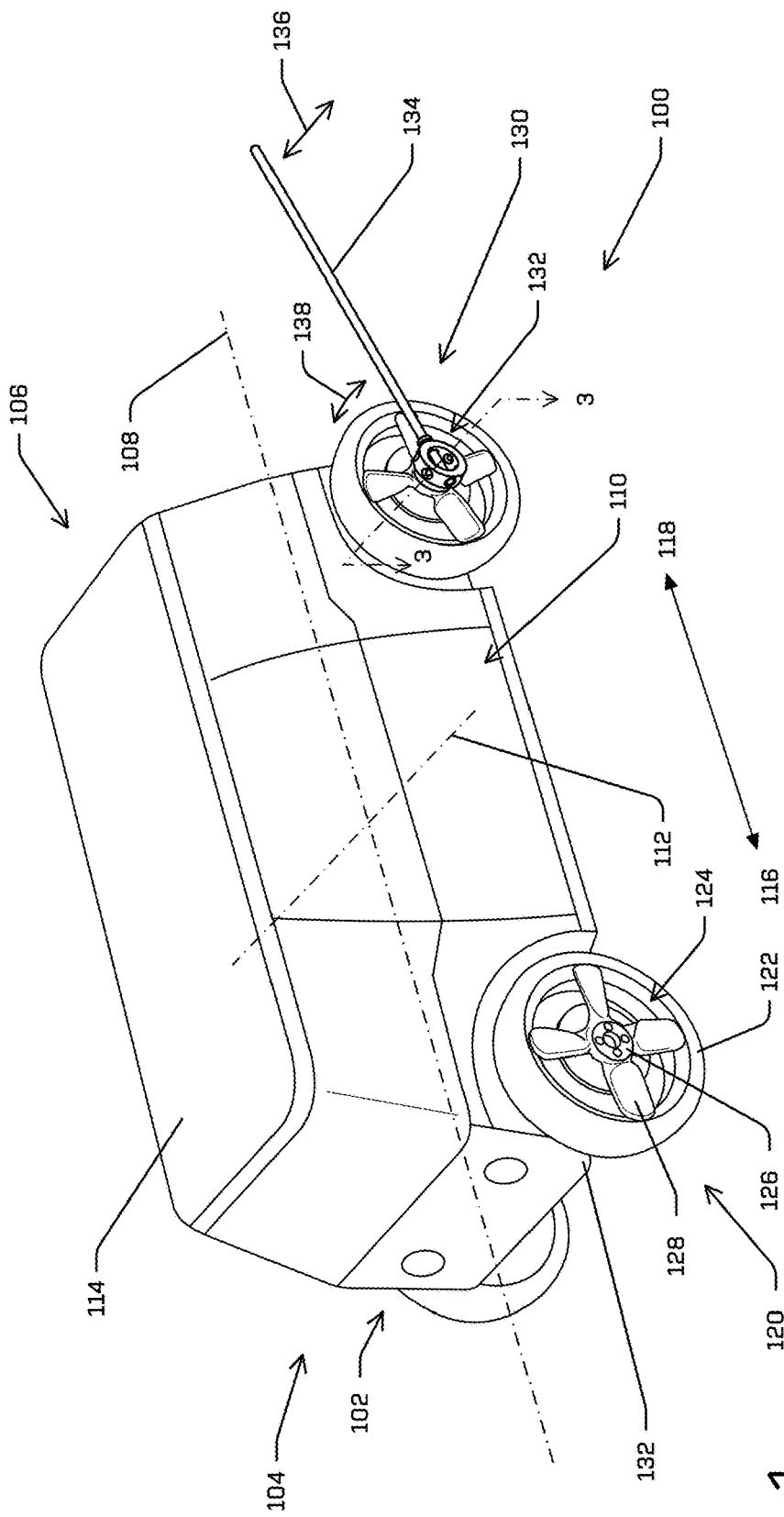
FIG. 1 is a perspective view of a vehicle, such as a bi-directional autonomous vehicle, and a manual steering tool coupled to the vehicle proximate a wheel of the vehicle, according to implementations of this disclosure.

The following detailed description is directed to systems and processes for controlling, e.g., manually controlling, a vehicle in an environment. As a brief example, unlike conventional automobiles, some autonomous vehicles may not be readily controlled by a passenger. By way of non-limiting example, some autonomous vehicles may not have onboard navigation controls, e.g., steering wheels, transmission controls, acceleration controls, and/or braking controls. However, there may be instances in which it is necessary to control the vehicle manually. For example, should the vehicle lose functionality because of depleted power, a malfunction, or the like, or should the vehicle be stuck or otherwise disabled, some degree of manual control of the vehicle may be required. As a non-limiting example, should a vehicle become disabled and require towing, it may be necessary to steer the wheels of the vehicle, e.g., to direct the vehicle out of a predicament (e.g., a ditch), to direct the vehicle onto a carrier, or the like. In conventional automobiles, it is not uncommon to turn the steering wheel to facilitate steering of the vehicle in such scenarios, even when the vehicle is not running or is otherwise disabled. However, and as noted above, when the vehicle has no steering wheel, the task of re-directing the wheels of the vehicle becomes more difficult.

Aspects of this disclosure relate to a manual steering tool that can be used with a vehicle, such as an autonomous vehicle, to manually steer the wheels of the vehicle. For example, implementations of this disclosure relate to a tool that may be selectively engaged with the vehicle, e.g., proximate a wheel of the vehicle, and that allows for manual manipulation of that wheel, and thus the vehicle.

In some implementations, a manual steering tool can include a coupler, a central hub, and an elongate member. The coupler can be configured for securing the central hub to the vehicle. In at least some examples described herein, the coupler can include a threaded opening that is configured for threaded engagement with a threaded end of a shaft on the vehicle. A wheel may be fixed to the shaft such that rotation of the shaft causes a corresponding rotation of the wheel, e.g., about a wheel axis. The shaft may extend through a central opening in a rim carrying a tire, for example.

The coupler may be configured to cooperate with the central hub such that threaded engagement of the coupler to the shaft secures the central hub relative to the wheel. In some examples described herein, the central hub includes a base and a clearance opening through the base. A body of the coupler extends at least partially through the clearance opening and a flange of the coupler contacts the base. In some examples, as the coupler is threaded onto the shaft of the vehicle, the flange biases the base of the central hub in a manner that causes a contact surface of the central hub to contact one or more fasteners, e.g., lug nuts, that secure the wheel to the vehicle. In examples, the contact surface may be formed on a protrusion extending from the base of the central hub.

In some aspects of this disclosure, the central hub may further include a sidewall that extends from the base, e.g., in a direction away from the shaft. An inner surface of the sidewall and the base of the central hub may define a bore. The flange of the coupler may be disposed in the bore. One or more holes may be formed through the sidewall. In examples, the holes may extend from an outer surface of the sidewall into the bore. In some examples, a plurality of holes may be circumferentially spaced about the sidewall. In at least some instances, two holes may be aligned on opposite sides of the bore, e.g., such that the opposing holes are aligned along a same hole axis.

In aspects of this disclosure, the holes in the sidewall may be configured to receive an end of the elongate member. For example, the elongate member may extend from a first end to a second end along a longitudinal axis, and the first end may be sized to be received in one or more of the holes such that the second end is spaced from the central hub. In examples in which two holes are provided on opposite sides of the bore, the first end of the elongate member may pass through a first of the holes, through the bore, and into a second hole opposite the first hole. In some instances, the elongate member can include a collar or depth limiting feature that prevents over-insertion of the elongate member into the opening(s).

In aspects of this disclosure, with the manual steering tool coupled to a vehicle proximate a wheel of the vehicle via the coupler and the second end of the elongate member being positioned away from the wheel, a technician or other user can apply a force on the elongate member to cause the wheel to pivot, e.g., to "steer" the wheel. For example, the technician can apply a pushing or pulling force proximate the second end of the elongate member that creates a moment or twisting force at an interface of the first end of the elongate member and the central hub. In some instances, the central hub may be configured to contact lug nuts or other fasteners to transmit the moment to the wheel at these contact points.

The techniques and systems described herein may be implemented in several ways. Example implementations are provided below with reference to the figures.

FIG. 1 shows an example vehicle 100 configured to move in an environment. The vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. This is merely an example, and the systems and methods described herein may be incorporated into any ground-borne vehicle, including those ranging from vehicles that need to be manually controlled by a driver at all times, to those that are partially- or fully-autonomously controlled.

The vehicle 100 may be powered by one or more internal combustion engines, one or more electric motors, hydrogen power, any combination thereof, and/or any other suitable power source(s). In the illustrated example, the vehicle 100 includes a body 102. The body 102 generally includes a first end 104 and a second end 106 spaced from the first end 104 along a longitudinal axis 108 of the vehicle 100. The vehicle body 102 also includes opposite sides 110 (one of which is obscured in the perspective of FIG. 1) spaced from each other along a lateral axis 112 such that one of the sides 110 is on either side of the longitudinal axis 108. The body 102 also includes a roof 114. Although a certain body styling is illustrated, the example vehicle 100 may be any configuration of vehicle, such as, for example, a van, a sport utility vehicle, a cross-over vehicle, a truck, a bus, an agricultural vehicle, and a construction vehicle.

The example vehicle 100 may have four-wheel steering and may operate generally with equal performance characteristics in all directions. For example, the vehicle 100 may be a bi-directional vehicle configured to move such that either the first end 104 or the second end 106 may be a front end of the vehicle 100 or a rear end of the vehicle 100. With specific reference to FIG. 1, the first end 104 of the vehicle 100 is the front or leading end of the vehicle 100 and the second end 106 of the vehicle 100 is the rear or trailing end when the vehicle travels in a first direction 116. Similarly, the second end 106 of the vehicle 100 is the front or leading end of the vehicle 100 and the first end 104 of the vehicle 100 is the rear or trailing end when the vehicle 100 travels in a second direction 118 opposite the first direction 116. These example characteristics may facilitate greater maneuverability, for example, in small spaces or crowded environments, such as parking lots and urban areas, and may also facilitate continued operation of the vehicle under certain circumstances, e.g., in the event of failure of some functionality of the vehicle 100. Moreover, and in conjunction with the bi-directional functionality, the first end 104 and the second end 106 may be substantially identical. For example, in some implementations including the illustrated example, the vehicle may be substantially longitudinally symmetrical, i.e., about a plane to which the longitudinal axis 108 is normal. As illustrated, the vehicle 100 may also be substantially laterally symmetrical, i.e., about a plane to which the lateral axis 112 is normal.

The vehicle 100 may travel through an environment, relying at least in part on sensor data indicative of objects in the environment in order to determine trajectories of the vehicle 100. For example, as the vehicle 100 travels through the environment, one or more sensors (not shown) may be configured to capture data associated with detected objects (e.g., other vehicles, pedestrians, buildings, barriers, etc.). The data captured may be used, for example, as input for determining trajectories for the vehicle 100. In implementations of this disclosure, the sensors may include, but are not limited to, image capture devices, LIDAR sensors, and/or other types of sensors. In some embodiments, the sensors may not be necessary and/or can be omitted entirely.

To enable movement of the vehicle 100 in the environment, and as also illustrated in FIG. 1, the body 102 is carried by a plurality of wheel assemblies or wheels 120. Each of the wheels 120 is illustrated as including a tire 122 mounted at a rim 124. The wheels 120 may also include a hub 126 and one or more spokes 128. In this disclosure, "rim" may be used to refer to some or all of the components that couple the wheel to the vehicle 100. For instance, the rim 124 can include the hub 126 and/or the spokes 128, in addition to the outer rim that interfaces with the tire, for example. Though depicted as four wheels 120 in FIG. 1 for illustrative purposes, any number of wheels (e.g. two, three, or more than four) can be in any configuration to facilitate travel of the vehicle 100. As detailed further herein, the rim 124 may be configured for mounting to the vehicle 100 via one or more fasteners, including but not limited to, lug nuts, a threaded shaft, or the like.

As noted above, while the vehicle 100 may be generally configured for travelling autonomously, e.g., without user interaction, some instances may occur in which it becomes necessary to move the vehicle manually. For instance, the vehicle 100 may be rendered unable to operate in accordance with autonomous driving systems and/or protocols due to a lack of power, a software, hardware, or other type of malfunction, and/or environmental conditions. In these and/or other instances, it may be necessary to manually move the wheels 120, e.g., to facilitate movement of the vehicle 100 for charging, service, and/or the like. More specifically, FIG. 1 illustrates a manual steering tool 130, according to aspects of this disclosure. As detailed herein, the manual steering tool 130 can be selectively affixed to the vehicle 100, e.g., proximate one of the wheels 120, to facilitate manual steering of one or more of the wheels 120.

In the example of FIG. 1, the manual steering tool 130 is illustrated as including a mounting portion 132 and an elongate member 134. The mounting portion 132 is configured to mount the tool 130 relative to one of the wheels 120. For example, and as detailed in examples herein, the mounting portion 132 may facilitate mounting to a shaft, e.g., a rotating shaft to which the wheel 120 is mounted and with which the wheel 120 rotates. In other examples, the mounting portion 132 may be configured for mounting directly to the rim 124, the hub 126, the spokes 128, and/or any other component of the wheel assemblies 120.

The elongate member 134 extends from the mounting portion 132 in a direction away from the wheel 120 to which the manual steering tool 130 is mounted. In the illustrated example, the elongate member 134 extends generally in a plane parallel to the longitudinal axis 108 of the vehicle 100. Regardless of the orientation, the elongate member 134 may be acted on to apply a force that is transmitted to the associated one of the wheels 120 to cause that wheel (and any other linked wheels 120) to pivot, e.g., to facilitate "steering" of the vehicle 100. In the illustrated example, a force may be applied generally along the arrow 136, e.g., by a person pushing or pulling proximate a distal end of the elongate member 134. As illustrated, the force along the arrow 136 will result in a corresponding pivot of the wheel 120, generally shown by the arrow 138. As will be appreciated, the elongate member 134 provides leverage to the human operator by allowing the human to apply a pushing or pulling force at a relatively large distance from the wheel, thereby facilitating a relatively large moment at the wheel 120 to overcome friction and/or restrictive forces that may work against external steering of the wheels 120.

In the illustrated example, the elongate member 134 extends generally along a length of the vehicle 100. This is for illustration only, and as will be appreciated, the elongate member 134 may extend at other angles or directions while still providing a mechanical advantage for steering the wheels 120. In one non-limiting example, the elongate member 134 may extend laterally from the vehicle 100, e.g., generally along an axis of rotation of the wheel to which the manual steering tool 130 is coupled. However, the illustrated arrangement may be desirable in some instances because a person may stand in front of (or behind) the vehicle 100, which may be a safer location should the vehicle 100 be near moving traffic or the like. Moreover, the illustrated arrangement may require less lateral clearance proximate the vehicle, which may be useful in certain locations or scenarios. As detailed further herein, in some instances the manual steering tool 130 may facilitate multiple attachment options for the elongate member 134, which may provide for positions of the elongate member 134 at a number of different positions, e.g., based on user preference, surrounding circumstances, and/or the like.

Figure 2:
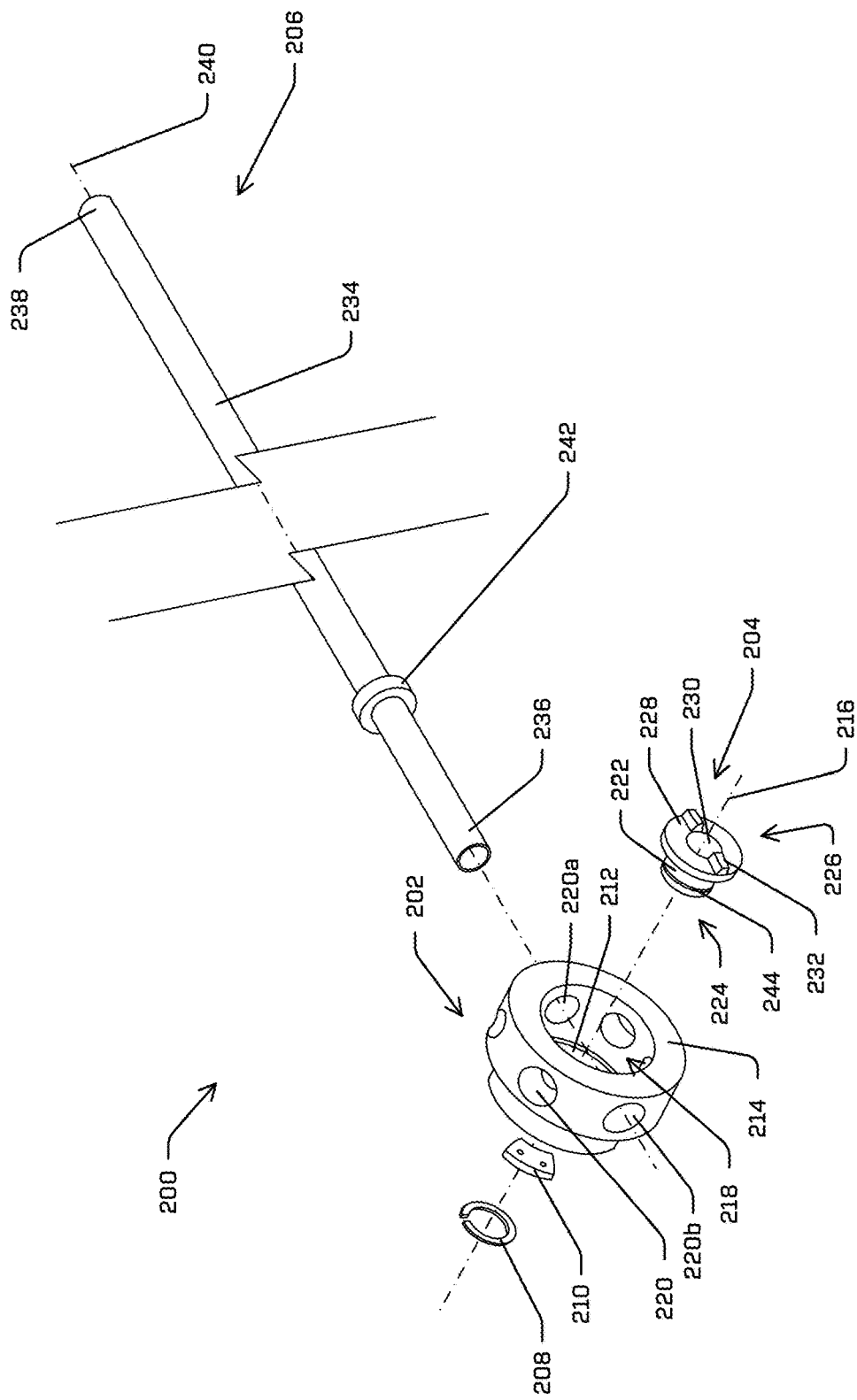
FIG. 2 is an exploded perspective view of a manual steering tool for use with a vehicle, according to aspects of this disclosure.

FIG. 2 is an exploded perspective view of a manual steering tool 200 according to examples of this disclosure. The manual steering tool 200 may be an example of the manual steering tool 130 discussed above in connection with FIG. 1. For instance, the manual steering tool 200 may be configured for selectively coupling to a vehicle, like the vehicle 100 described above, to manually move one or more wheels of the vehicle, e.g., to steer the vehicle.

FIG. 2 shows that the manual steering tool 200 includes a central hub 202, a coupler 204, and an elongate member 206. FIG. 2 also shows that the manual steering tool 200 can optionally include a retention member 208 and/or an alignment member 210. Each of these, and additional, components will be described further.

The central hub 202 is illustrated as a generally cylindrical member that includes a base 212 and a sidewall 214 extending from the base generally along a central axis 216. As detailed further herein, when the manual steering tool 200 is coupled to a vehicle, the central axis 216 may align with a wheel axis, e.g., an axis about which the wheel rotates to drive the vehicle. The sidewall 214 defines a cylindrical opening or bore 218.

The central hub 202 also includes a plurality of holes 220 formed through the sidewall 214, e.g., from the bore 218 to an outer surface of the sidewall 214. As shown, the holes 220 extend generally radially from the central axis 216. In the specific example of FIG. 2, six holes are formed through the sidewall 214 with opposing holes being aligned with each other, e.g., disposed along a same hole axis perpendicular to the central axis 216. Although six instances of the holes 220 are shown in FIG. 2, more or fewer holes may be provided. Moreover, although the holes 220 are illustrated as extending along hole axes that are perpendicular to the central axis 216, in other examples the holes 220 may be angled relative to what is illustrated. As detailed further herein, the holes 220 are configured to receive an end of the elongate member 206.

Although obscured in the example of FIG. 2, the central hub 202 includes a clearance hole extending through the base 212. As detailed further herein, the clearance hole provides clearance over a shaft to which the manual steering tool 200 is to be secured and over at least a portion of the coupler 204.

The coupler 204 is a generally cylindrical member having a body 222 (e.g., a cylindrical body) extending from a first end 224 to a second end 226. The coupler 204 also includes a flange 228 extending from the body 222 proximate the second end 226. The body 222 has an outer diameter that is smaller than a diameter of the clearance hole (not visible in FIG. 2) of the hub 202. In this way, the body 222 of the coupler 204 passes through the clearance hole of the hub 202. However, the flange 228 has an outer extent, e.g., an outer diameter, that is larger than the diameter of the clearance hole. Thus, while the body 222 will pass through the clearance hole, the flange 228 contacts the base 212 proximate the clearance hole such that the flange 228 is disposed in the bore 218.

An axial opening 230 extends through the coupler 204. Although obscured in FIG. 2, one or more threads are formed in the axial opening 230, e.g., so the axial opening 230 is a threaded hole. As described further herein, the threads are configured to cooperate with one or more external threads on a shaft (shown in FIG. 3) on which a wheel rotates. Accordingly, the threads in the axial opening 230 engage with the threads on the shaft such that the coupler 204 can be tightened on the shaft. As the coupler 204 is tightened on the shaft using the mating threads, the flange 228 contacts the base 212 of the hub 202, securing the hub 202.

As also illustrated in FIG. 2, the coupler 204 includes two protrusions 232 extending from the flange 228 in a direction away from the first end 224 of the body 222. The protrusions 232 form tabs or ears that may be used to facilitate threaded engagement and disengagement of the coupler 204 to the threaded shaft. More specifically, the protrusions 232 may form surfaces against which a user may apply pressure to tighten/loosen the coupler 204 on the shaft. In other examples, the protrusions 232 may be replaced with one or more other features. For example, and without limitation, in other examples the flange 228 may define an opening, e.g., a slot, a hexagonal opening, or the like that, configured to receive a tool that may facilitate turning of the coupler 204.

As just described, the coupler 204 may be used to secure the hub 202 relative to a wheel of a vehicle, e.g., one of the wheels 120 of the vehicle 100 of FIG. 1, described above. Secured in this manner, the elongate member 206 can be selectively engaged with the central hub 202.

The elongate member 206 has a body 234 (cylindrical in the example of FIG. 2) that extends from a first end 236 to an opposite, second end 238 along a longitudinal axis 240. Proximate the first end 236, the body 234 is configured for insertion into one or more of the holes 220 of the central hub 202. In the illustrated example, the body 234 proximate the first end 236 of the elongate member 206 has an outer diameter that is less than a diameter of the holes 220, such that a clearance fit exists between the holes 220 and the elongate member 206. In use, the first end 236 of the elongate member 206 is inserted into a first hole 220a of the holes 220, passes through the bore 218, and at least partially enters a second hole 220b, opposite the first hole 220a.

Once inserted into the hole(s) as just described, a user may apply a force to the elongate member, e.g., at a location proximate the second end 238 of the elongate member 206. In the example illustrated, the body 234 of the elongate member 206 may be disposed in both the first hole 220a and the second hole 220b. Accordingly, the application of force proximate the second end 238 will cause a corresponding force on the hub 202 at both the interface with the first hole 220a and the second hole 220b. In other examples, the elongate member 206 may be disposed only in a single hole, e.g., the first hole 220a. In these examples, however, the contact area between the elongate member 206 and the hub will be less than when the elongate member is disposed in two holes.

As also illustrated in FIG. 2, a collar 242 is disposed on the elongate member 206 at a position spaced from the first end 236. In examples, the collar 242 may be a stop or limiter positioned to allow for insertion of the elongate member into the holes to a specific depth. For instance, a distance between the first end 236 of the elongate member 206 and the collar 242 may generally correspond to a diameter of the outer surface of the sidewall 214. Accordingly, when the elongate member 206 is inserted into one of the holes 220 of the hub 202, the collar 242 will contact the outer surface of the sidewall 214 when the elongate member is fully inserted into two of the holes, e.g., the first hole 220a and the second hole 220b. Thus, in addition to establishing an insertion depth for the elongate member 206, the collar 242 may also act as a visual and/or tactile cue for the user that the elongate member is appropriately positioned.

Modifications to the elongate member 206 also are contemplated. For example, although the elongate member 206 is illustrated as having a cylindrical body, in other examples the body may be differently shaped. As will be appreciated, if the outer surface of the elongate member is other than cylindrical, the holes 220 will have a corresponding profile. For example, different shapes may facilitate a keyed-type arrangement, which will prevent rotation of the elongate member relative to the hole. In other examples, the body of the elongate member 206 may have multiple thicknesses. For example, instead of the collar 242 coupled to an exterior of the body 234 of the elongate member 206, the body 234 may be relatively larger, e.g., have a greater diameter, proximate the second end 238, with the larger diameter providing the functionality of the collar 242, discussed above.

As illustrated in FIG. 2, the manual steering tool 200 can also optionally include the retention member 208. The retention member 208 is generally configured to maintain a connection of the coupler 204 and the central hub 202. In the example, the retention member 208 is a retaining ring configured for placement in a retention groove 244 in the body 222 of the coupler 204. When the body 222 of the coupler 204 is passed through the clearance hole of the central hub 202, the retention member 208 can be seated in the retention groove 244. The retention member 208 has a larger extent, e.g., a greater diameter, than the clearance hole of the hub. Accordingly, with the retention member 208 in the retention groove 244, the coupler 204 cannot be completely separated from the hub 202.

Although the retention member 208 is illustrated as a retention ring, in other examples the retention member 208 may be otherwise configured. For example, and without limitation, the retention member 208 can be a pin configured to extend at least partially into (or through) the body 222 of the coupler 204. In other examples, and as noted above, the retention member 208 may not be included, e.g., which may allow for complete separation of the coupler 204 from the central hub 202.

The manual steering tool 200 can also optionally include the alignment feature 210. In examples, the alignment feature 210 may be configured to properly align the hub 202 relative to a wheel with which the tool 200 is to be used. For example, and as detailed further below with reference to FIGS. 4A and 4B, the alignment feature 210 may be configured for placement between adjacent fasteners used to secure the wheel to the vehicle, e.g., between adjacent lug nuts. In this manner, the alignment feature 210 can also, or alternatively, substantially inhibit rotation of the hub 202 relative to the wheel. In other examples, the alignment feature 210 may not be included.

Figure 3:
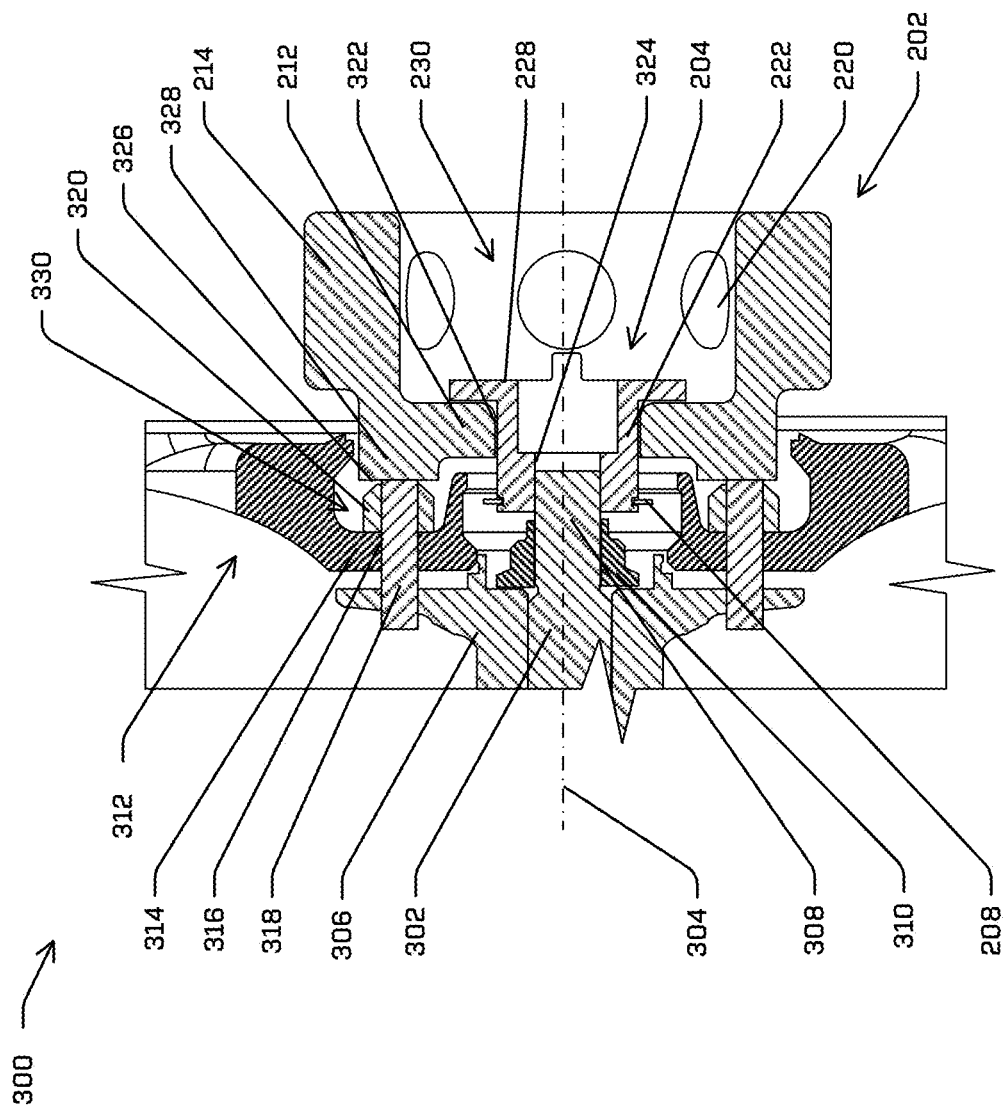
FIG. 3 is a partial cross-sectional view of aspects of a manual steering tool and wheel relative to which the manual steering tool is coupled, according to implementations of this disclosure.

FIG. 3 is a partial cross-sectional view 300 corresponding to a view taken along the line 3-3 in FIG. 1. In more detail, FIG. 3 shows aspects of the manual steering tool 200 coupled to a wheel. In FIG. 3, the elongate member 206 is omitted for clarity, but other features of the manual steering tool 200 are illustrated and are given the same reference numerals as those used in FIG. 2.

FIG. 3 shows that aspects of a vehicle include a shaft 302 configured to rotate about a wheel axis 304. The shaft 302 may be driven by one or more actuators (not shown) to rotate about the wheel axis 304. More specifically, a wheel (like the wheel 120 discussed above) may be coupled to the shaft 302 such that rotation of the shaft 302 about the wheel axis 304 causes corresponding rotation of the wheel. The shaft 302 may form a part of an axle. In other examples, however, the shaft may be coupled to a vehicle, e.g., using a joint, linkage, or the like, in a manner that allows for steering of the wheel, e.g., by altering an orientation of the wheel axis 304, in addition to rotating the shaft 302 about the wheel axis 304.

In the example of FIG. 3, a hub 306 is coupled to the shaft 302. In the illustrated example, the hub 306 has a central (e.g., axial) opening that slides over the shaft 302. Although not shown, the hub 306 may be keyed or otherwise connected to the shaft 302 such that rotation of the shaft 302 about the wheel axis 304 causes a corresponding rotation of the hub 306. In other examples, the hub 306 may be press fit onto the shaft 302, threaded onto the shaft 302, or otherwise secured to the shaft 302 such that the hub 306 rotates with the shaft 302. The hub 306 is also secured axially to the shaft 302, e.g., to prevent relative axial movement. In the example of FIG. 3, a distal end of the shaft 302 is a threaded end 308. For example, the threaded end 308 includes one or more threads formed on an exterior of the shaft 302. As also shown in FIG. 3, a collar 310 is threaded onto the threaded end 308. The collar 310 abuts or otherwise contacts the hub 306 to restrict movement of the hub 306 in an axial direction (e.g., along the wheel axis 304) relative to the shaft 302.

A rim 312 is secured to the hub 306. The rim 312 may correspond to the rim 124 of FIG. 1. In more detail, the rim 312 includes a central, hub portion 314 configured to facilitate connection of the rim 312 to the hub 306. A plurality of openings 316, e.g., circumferentially spaced holes, are formed through the hub portion 314. The openings 316 align with threaded posts 318 secured to and extending from the hub 306. As illustrated in FIG. 3, the openings 316 receive the posts 318 such that the threaded posts 318 extend through the rim 312. Nuts 320, e.g., lug nuts, are threaded and tightened onto the threaded posts 318 to secure the rim 312 relative to the hub 306. The threaded posts 318 and the corresponding nuts 320 are example fasteners for securing a wheel to a vehicle. Other fastening schemes may alternatively be used.

With the rim 312 fixed to the hub 306 and the hub 306 fixed to the shaft 302, rotation of the shaft 302 will cause corresponding rotation of the hub 306, e.g., about the wheel axis 304, which will cause corresponding rotation of the rim 312. Although not illustrated in FIG. 3, the rim 312 may, at an outer circumference, support a tire or other structure configured to contact a driving surface. Thus, rotation of the shaft 302 causes a corresponding rotation of a wheel to move a vehicle along a driving surface.

FIG. 3 also shows the central hub 202 of the manual steering tool 200 secured to the vehicle using the coupler 204. FIG. 3 shows a clearance hole 322 extending through the base 212 of the central hub 202. The body 222 of the coupler 204 extends through clearance hole 322 such that the flange 228 of the coupler 204 contacts the base 212 in the bore 230. The body 222 of the coupler 204 extends a sufficient distance from the central hub 202 of the tool 200 that a threaded opening 324 in the coupler 204 can engage, e.g., be threaded onto, the threaded end 308 of the shaft 302. Thus, threading the coupler 204 onto the shaft 302 will selectively secure the central hub 202 (and thus the tool 200) relative to the vehicle. The elongate member 206 (not shown in FIG. 3) may then be inserted into one or more of the holes 220 to facilitate manual pivoting of the shaft 302 and the wheel assembly coupled to the shaft 302.

As best illustrated in FIG. 3, the central hub 202 of the tool can define a contact surface 326 that contacts a portion of the vehicle with continued engagement, e.g., tightening, of the coupler 204 on the shaft 302. In the example of FIG. 3, the contact surface 326 is formed on a protrusion 328 that extends from the base 212 of the central hub 202. More specifically, the protrusion 328 extends in a direction opposite the sidewall 214.

In the illustrated example, the contact surface 326 is configured to contact the threaded posts 318 and/or the nuts 320 that are used to secure the rim 312 to the hub 306, as detailed above. In examples, contact of the contact surface 326 with the fasteners that retain the rim 312 on the hub 306 may cause any forces applied via operation of the elongate member to be distributed among the fasteners. This distribution may reduce any moments or twisting forces on the shaft 302 and/or the rim 312, which may be more susceptible to structural deformation under large loads applied during manual steering. In the illustrated example, the rim 312 defines a recess 330 in which the nuts 320 are disposed when the rim 312 is secured to the hub 306. In examples, the outer diameter of the protrusion 328 may be configured such that the protrusion 328 at least partially extends into the recess 330, while maintaining clearance between the rim 312 and the central hub 202 of the tool 200.

Figure 4B:
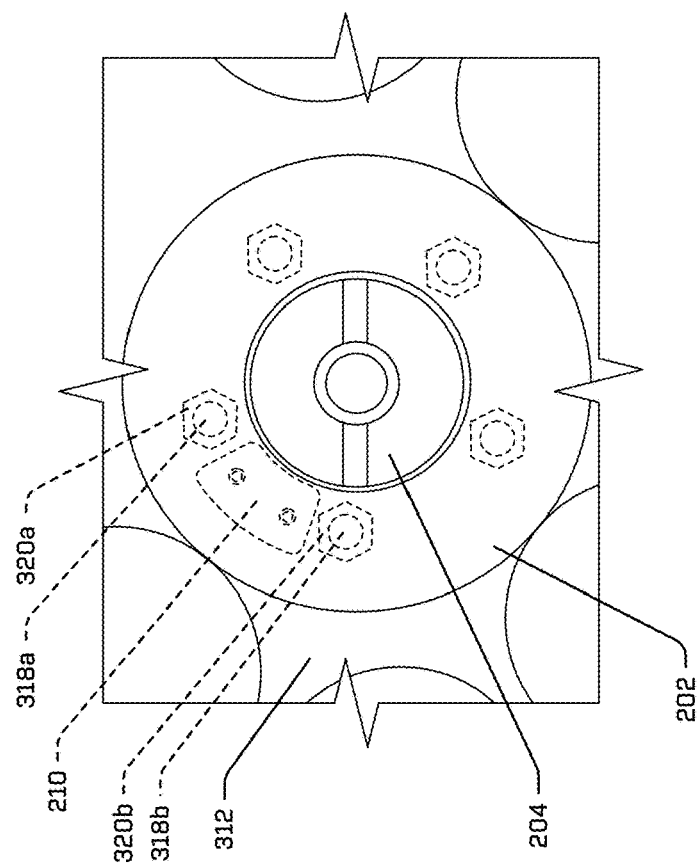
FIG. 4B is an elevation view of the portion of the manual steering tool of FIG. 4A coupled to a rim of a wheel, according to additional examples of this disclosure.
Figure 4A:
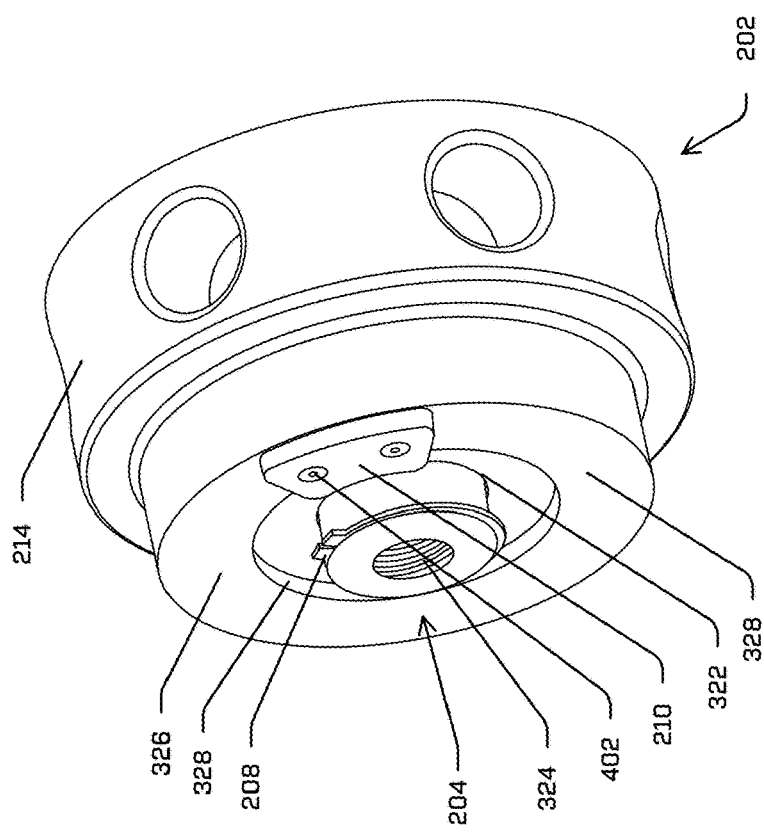
FIG. 4A is a perspective view of a portion of the manual steering tool of FIGS. 2 and 3, according to implementations of this disclosure.

FIG. 4A is a perspective view showing the central hub 202 and the coupler 204 of the manual steering tool discussed above. More specifically, FIG. 4A is a rear perspective view better showing the body 222 of the coupler 204 extending through the clearance hole 322 of the central hub 202. FIG. 3 also shows the threaded opening 324 of the coupler 204, which is used to secure the coupler 204 and the hub 202 to the shaft 302 (not shown in FIG. 4A). FIG. 4A also shows the retaining member 208 coupled to the coupler 204. As illustrated, the retaining member 208 extends beyond the diameter of the clearance hole 322. For instance, the retaining member 208 has a larger outer diameter than the diameter of the clearance hole 322. When the retaining member is engaged with the coupler 204, the retaining member 208 prevents separation of the coupler 204 from the central hub 202.

FIG. 4A also shows the alignment feature 210 in more detail. As illustrated, the alignment feature is secured to the contact surface 326, e.g., to extend further along the axial direction. FIG. 4A shows two fasteners 402, which may be screws, bolts, or the like, securing the alignment feature 210 to the contact surface 326. So secured, the alignment feature 210 projects from the contact surface, e.g., in a direction away from the sidewall 214.

FIG. 4B shows functionality associated with the alignment feature 210. Specifically, FIG. 4B is an elevation view of the coupler 204 and the central hub 202 secured relative to the rim 312. FIG. 4B also shows the threaded posts 318 and the nuts 320 in hidden lines (because these features would be otherwise obscured by the central hub 202 in this view). As shown, the threaded posts 318 and the nuts 320 are spaced circumferentially about a rotational axis, e.g., the wheel axis 304.

As will be appreciated from the description of FIGS. 3 and 4A, the central hub 202 may be secured to the vehicle such that the contact surface 326 contacts the threaded posts 318 and/or the nuts 320. As noted above, the alignment feature 210 protrudes from the contact surface 326, e.g., into the plane of the view of FIG. 4B. In examples, the alignment feature 210 is sized to fit between adjacent of the nuts 320. For example, FIG. 4B shows a first nut 320a associated with a first threaded post 318a and a second nut 320b associated with a second threaded post 318b. FIG. 4B also shows that circumferential extents of the alignment feature 210 are smaller than a distance between the first nut 320a and the second nut 320b. As will be appreciated, when the central hub 202 and the coupler 204 are positioned for coupling to the rim 312, the central hub 202 will be "seated" relative to the rim 312 only when the alignment feature 210 is disposed between the lug nuts 320. If the central hub 202 is rotated relative to the illustrated position, the alignment feature 210 may contact one of the posts 318 and/or one of the nuts 320. This contact may prevent coupling of the coupler 204 to the shaft 302, e.g., because the threaded opening 324 may be axially spaced from the shaft 302.

The alignment feature 210 may also provide a locking or keying benefit. For instance, the coupler 204 in the illustrated examples acts to urge the contact surface 326 against the posts 318/nuts 320, e.g., via contact of the flange 228 and the base 212. With this arrangement, the central hub 202 may be rotatable relative to the coupler 204. However, because the alignment feature 210 extends between adjacent of the nuts 320, rotation of the central hub 202 relative to the coupler 204 may be impeded by contact between the alignment feature 210 and one of the nuts 320. In examples, inhibiting rotation of the central hub 202 may increase ease of use when the elongate member 206 is inserted into the holes 220, e.g., by insuring that the elongate member maintains a substantially fixed orientation relative to the wheel axis when the user applies a force to steer the wheel.

Figure 5:
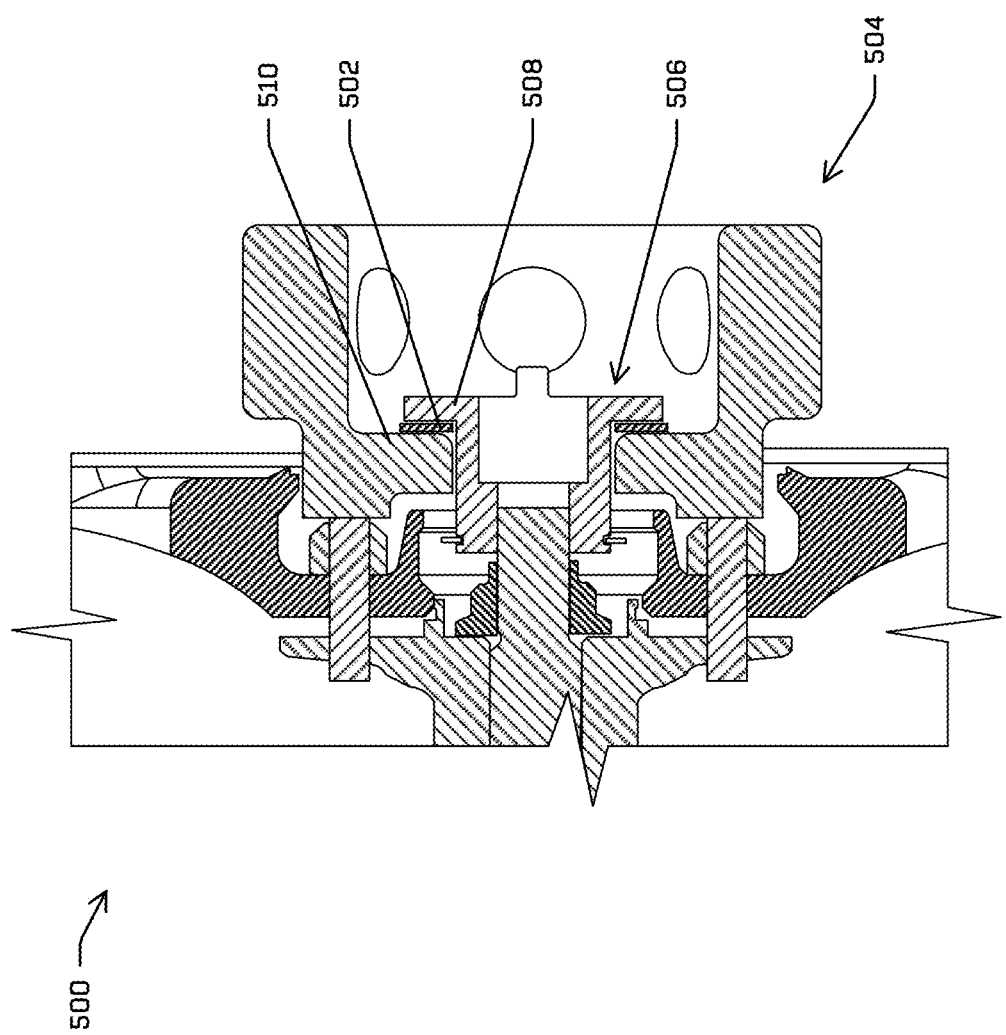
FIG. 5 is a partial cross-section view of aspects of an alternative manual steering tool and wheel relative to which the manual steering tool is coupled, according to implementations of this disclosure.

In examples like 4B in which the alignment feature 210 functions to inhibit relative rotation of the central hub 202 (and thus the elongate member 206 coupled to the central hub 202), the tool 200 may be used to steer the vehicle when the vehicle is stationary. If the vehicle is moving, the elongate member would rotate about the wheel axis, which could be harmful to the elongate arm, anything or anyone in proximity of the elongate arm, and/or the vehicle. However, in some examples it may be desirable to steer the vehicle while the vehicle is moving, e.g., as the vehicle is being towed at low speeds or the like. FIG. 5 is an example of aspects of a modified manual steering tool 500, which is modified relative to the manual steering tool 200 described above. The modified manual steering tool 500 may facilitate dynamic steering.

More specifically, FIG. 5 is a partial cross-sectional view generally corresponding to the view of FIG. 3. Features of the modified manual steering tool 500 may be substantially the same as the steering tool 200 discussed above. However, and as illustrated, the modified manual steering tool 500 includes a bearing 502 that facilitates relative rotation of a central hub 504, which may correspond to the central hub 202 discussed above, relative to a coupler 506, which may correspond to the coupler 204 discussed above. In the example, the bearing 502 comprises a flat, washer-shaped bearing positioned at an interface of a flange 508 of the coupler 506 and a base 510 of the central hub 504. For example, the flange 508 may correspond to the flange 228 of the coupler 204 discussed above and/or the base 510 may correspond to the base 212 of the central hub 202 discussed above. Also, and as will be appreciated, the tool 500 may be devoid of an alignment feature like the alignment feature 210 discussed above. As described in connection with FIGS. 4A and 4B, the alignment feature 210 can prevent rotation of the central hub 202 relative to the coupler 204, whereas in the example of FIG. 5, this relative rotation may be desirable and facilitated by the bearing 502. During use of the tool 500, the wheel may rotate, e.g., as the vehicle is towed. This rotation of the wheel may cause corresponding rotation of the coupler 506, but the rotation of the coupler 506 is relative to the central hub 504. Accordingly, for example, a user can maintain a constant or otherwise desired orientation of the elongate member (not shown in FIG. 5) even as the wheel turns, thus allowing for manual steering as the vehicle moves. Of course, using the tool 500 to steer the vehicle may be ill advised for certain users and/or applicable safety precautions should be taken to avoid injury resulting from improper use of the tool 500.

Although the example of FIG. 5 includes the bearing 502 to facilitate rotation of the base 510 of the central hub 504 relative to the flange 508 of the coupler 506, in other examples the bearing may be otherwise formed. For example, and without limitation, the bearing 502 may include a sleeve, e.g., disposed over a body of the coupler 506, positioned for contact by a clearance hole of the coupler 504. In other examples the bearing 502 may be omitted. In these examples, aspects of the hub 504 and/or the coupler 506 (or of the hub 202 and the coupler 204) may be configured to facilitate relative rotation. For example, the hub and/or the coupler may be formed of lubricious or other materials that facilitate non-destructive relative rotation. For instances surfaces that will contact and move relative to other components may be treated, formed, or otherwise configured to facilitate relative movement.

As will be appreciated from the foregoing, aspects of this disclosure relate to a manual steering tool that can be selectively secured to a vehicle, proximate a wheel, to facilitate application of a force that pivots (e.g., steers) the wheel. In operation, in response to a vehicle being in a situation that necessitates manual steering or recovery, e.g., via towing, a technician or other user may position the central hub 202, 504, such that the contact surface 326 contacts the fasteners, e.g., the nuts 320, maintaining the wheel on the vehicle. As described above, the alignment feature 210 may assist with properly orienting the central hub 202 relative to the rim 312. With the central hub properly positioned, the technician may thread the coupler 204, 506 onto the vehicle shaft. For example, the technician may apply a torque to the coupler 204, 506, using the protrusions 232. Once tightened, the coupler 204, 506, retains the central hub 202, 504 relative to the wheel. The technician may then insert the elongate member 206 into one or more of the holes 220, as discussed above. Once inserted, the technician can apply a force on the elongate member 206 at a position spaced from the wheel, with the force causing the wheel to pivot, e.g., by transmitting the force the interface between the contact surface 326 and posts 318, nuts 320 and/or to the interface between the threaded opening 324 of the coupler 204, 506 and the shaft 302. In examples, the force applied by the technician can overcome any frictional or other forces, e.g., at the wheel. To further facilitate ease of use, in some instances the attachment of the tool 200, 500 to the wheel may also act to temporarily disconnect the wheel from a driveshaft (e.g., of an electric motor that drives the shaft 302) and/or to temporarily disconnect aspects of a steering mechanism in the vehicle 100 . . . . For instance, disconnecting the wheel in this manner may remove regenerative braking forces, driving forces, and/or other forces that would otherwise have to be overcome by the technician acting on the elongate member 206.

Once the wheels of the vehicle are properly aligned, the elongate member 206 may be removed, and the vehicle can be moved as required, e.g., by towing or other means.

As will be appreciated, the technician can select one or more wheels for coupling of the manual steering tool 200, 500, e.g., based on environmental conditions, accessibility, or the like. Moreover, when each of the wheels of the vehicle is independently steerable, a technician may repeatedly apply forces at different wheels, e.g., by coupling the tool 200, 500 to a first wheel, manipulating the first wheel, decoupling the tool 200, 500 from the first wheel, coupling the tool 200, 500 to a second wheel, manipulating the second wheel, and so forth.

In the foregoing examples, the manual steering tools 200, 500 include a coupler 204, 506 that is threaded onto an exposed thread of a shaft that rotates a wheel. Some vehicles may not include a threaded shaft and/or it may be impractical and/or undesirable to use the threaded shaft. In these examples, the coupler may be configured to otherwise secure a manual steering tool relative to a wheel of a vehicle. For example, FIG. 6 shows an example of a manual steering tool 600 that may be otherwise secured relative to a vehicle/wheel.

Figure 6:
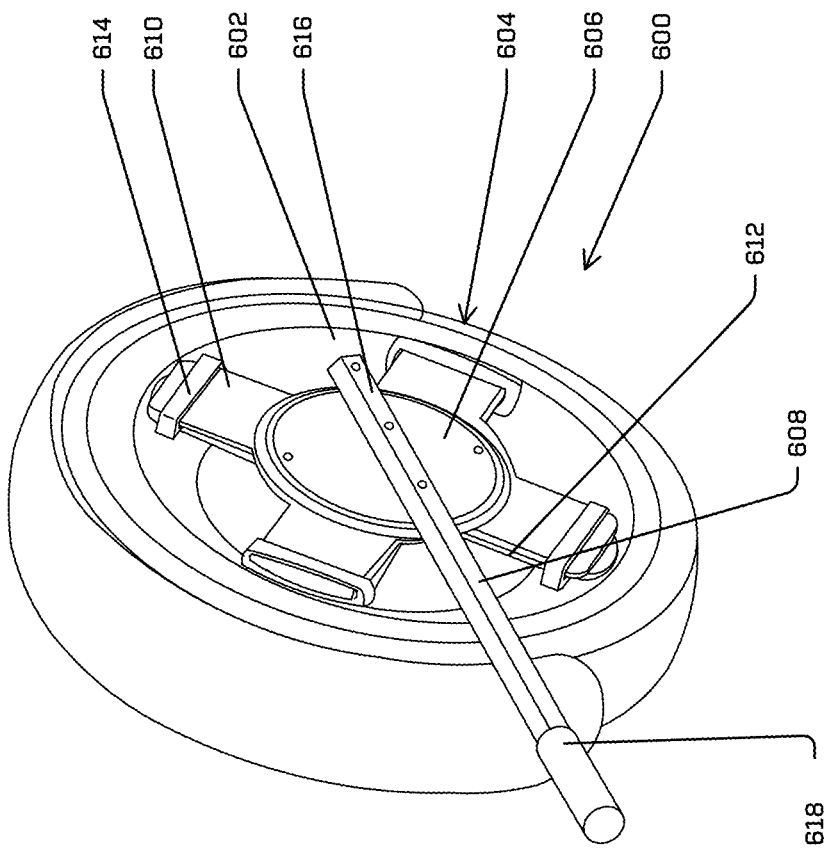
FIG. 6 is a perspective view of an alternative manual steering tool, according to implementations of this disclosure.

In FIG. 6, the manual steering tool 600 is shown coupled to a wheel 602 of a vehicle. The manual steering tool 600 includes a coupler 604, a central hub 606, and an elongate member 608 coupled to the central hub 606.

In the example of FIG. 6, the coupler 604 has a substantially planar body that includes a plurality of arms 610 (four of which are shown). The arms 610 generally correspond in shape (e.g., width) and/or position with spokes 612 of the wheel 602. The coupler 604 also includes a plurality of straps 614, e.g., one corresponding to each of the arms 610. The straps 614 are configured to secure the arms 610 to the spokes 612, generally as illustrated in FIG. 6. Without limitation, the straps 614 may include a ratcheting or similar mechanism that facilitates tightening of the straps 614 around the arms 610/spokes 612, to selectively couple the arms 610 to the spokes 612. Although the coupler 604 is illustrated as including the straps 614 other example implementations can use other mechanisms for securing the arms 610 relative to the spokes 612. Without limitation, the spokes may include one or more threaded holes, and the arms may have corresponding holes through which a threaded fastener may be passed. Other coupling schemes also are contemplated, and will be appreciated by those having ordinary skill in the art with the benefit of this disclosure.

The central hub 606 is illustrated as a disc. In examples, the central hub may be coupled to the coupler 604. For instance, the central hub 606 may be fixed to the coupler 604. In other examples, however, the central hub 606 may be coupled to the coupler 604 in a manner that facilities relative rotation of the central hub 606 to the coupler 604. For example, and although not illustrated in FIG. 6, a bearing race may be formed in a surface of the coupler 604 that faces the central hub 606 or in a surface of the central hub 606 that faces the coupler 604. In some examples, the coupler 604 or the central hub 606 may have a post extending toward the other of the central hub 606/coupler 604 and the other of the central hub 606/coupler 604 may have a receptacle for receiving the post to couple the coupler 604 and the central hub 606 and/or to facilitate relative rotation of those components.

A first end 616 of the elongate member 608 is secured to the central hub 606. The elongate member 608 extends from the first end 616 to a second end 618 spaced from the wheel 602. As with the previous examples, a technician or other user can apply a force proximate the second end 618 of the elongate member to facilitate pivoting, e.g., steering, of the wheel 602.

References to "one aspect," "an aspect," "example aspect," "various aspects," etc., may indicate that the aspect (s) of the present disclosure may include a particular feature, structure, or characteristic, but not every embodiment necessarily includes the particular feature, structure, or characteristic. Further, repeated use of the phrase "in one aspect," or "in an exemplary aspect," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

While one or more embodiments have been described, various alterations, additions, permutations, and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Furthermore, although the subject matter has been described in language specific to structural features and/or methodological acts, it is to be understood that the subject matter defined in the appended claims is not necessarily limited to the specific features or acts described. Rather, the specific features and components are disclosed as exemplary forms of implementing the claims.

EXAMPLE CLAUSES

A: An example manual steering tool for a vehicle, includes: a central hub selectively couplable to a wheel of an autonomous vehicle, the wheel being secured to a shaft that is rotatable about a wheel axis, the central hub comprising: a base, a clearance hole through the base, the clearance hole being configured to provide a clearance fit over the shaft when the central hub is coupled to the wheel, a sidewall extending from the base and defining a bore, and one or more holes extending through the sidewall, individual of the one or more holes extending along a hole axis angled relative to the wheel axis, a coupler configured for selectively coupling the central hub to the shaft, the coupler being disposed at least partially in the bore and extending through the clearance hole of the base; and an elongate member disposed at least partially in one of the one or more holes, wherein application of a force at a location along the elongate member spaced from the central hub causes the wheel and the wheel axis to pivot relative to the autonomous vehicle.

B: The manual steering tool of example A, wherein: the wheel comprises a rim that is secured to the autonomous vehicle using one or more fasteners; and the central hub contacts the one or more fasteners when the central hub is coupled to the wheel, such that the application of force is transferred to the one or more fasteners.

C: The manual steering tool of example A or example B, wherein: the central hub comprises a protrusion extending from the base in a direction opposite the sidewall, the protrusion defining a contact surface configured to contact the one or more fasteners.

D: The manual steering tool of any one of example A through example C, wherein the wheel comprises a rim that is secured to the autonomous vehicle using a plurality of fasteners spaced circumferentially about the wheel axis, the steering tool further comprising: an alignment feature extending from the central hub in a direction opposite the sidewall, the alignment feature being configured for placement between adjacent of the plurality of fasteners to locate the central hub relative to the wheel.

E: The manual steering tool of any one of example A through example D, wherein the coupler comprises: a cylindrical body including a thread configured for cooperating with one or more threads on the shaft; and a flange extending radially from the cylindrical body, the flange being disposed in the bore and extending radially outward a distance sufficient to prohibit the coupler from passing through the clearance hole of the central hub.

F: The manual steering tool of any one of example A through example E, wherein the flange is disposed at a first end of the cylindrical body, the coupler further comprising: a retaining member proximate a second end of the cylindrical body, the retaining member being configured to prevent separation of the coupler from the central hub.

G: An example manual steering tool includes: a hub; a coupler configured for selectively coupling the hub relative to a wheel of a vehicle at a position proximate a rim of the wheel; and an elongate member coupled to the hub, wherein application of a force at a location along the elongate member spaced from the hub causes the wheel to pivot relative to the vehicle.

H: The manual steering tool of example G, wherein the hub comprises: a base, a clearance hole through the base, a sidewall extending from the base and defining a bore, and one or more holes extending through the sidewall, individual of the one or more holes extending along a hole axis angled relative to a wheel axis about which the wheel rotates.

I: The manual steering tool of example G or example H, wherein a first hole of the one or more holes and a second hole of the one or more holes are aligned along the hole axis and the hole axis is substantially normal to the wheel axis.

J: The manual steering tool of any one of example G through example I, wherein the coupler is disposed at least partially in the bore and extends through the clearance hole of the base.

K: The manual steering tool of any one of example G through example J, wherein the coupler comprises: a cylindrical body including a thread configured for cooperating with one or more threads on a shaft of the wheel, the shaft being rotatable about the wheel axis; and a flange extending radially from the cylindrical body, the flange being disposed in the bore and extending radially outward a distance sufficient to prohibit the coupler from passing through the clearance hole of the hub.

L: The manual steering tool of any one of example G through example K, wherein the coupler further comprises one or more user engagement surfaces to facilitate threading of the coupler onto the shaft.

M: The manual steering tool of any one of example G through example L, wherein the elongate member further comprises a main body and a collar extending radially outward from the main body, the collar being configured to contact the sidewall of the base when the elongate member is inserted into the one or more holes.

N: The manual steering tool of any one of example G through example M, wherein: the wheel comprises a rim that is secured to the vehicle using one or more fasteners; and the hub comprises a protrusion extending from the base in a direction opposite the sidewall, the protrusion defining a contact surface configured to contact the one or more fasteners.

O: The manual steering tool of any one of example G through example N, wherein the wheel comprises a rim that is secured to the vehicle using a plurality of fasteners spaced circumferentially about a wheel axis, the steering tool further comprising: an alignment feature extending from the hub, the alignment feature being configured for placement between adjacent of the plurality of fasteners to locate the hub relative to the wheel.

P: The manual steering tool of any one of example G through example O, further comprising: a bearing between the hub and the coupler, the bearing facilitating relative rotation of the hub and the coupler.

Q: The manual steering tool of any one of example G through example P, wherein the coupler is coupled to a rim associated with the wheel.

R: An example steering tool for a vehicle includes: a hub selectively securable to a wheel of a vehicle, the wheel being configured to rotate with a shaft about a wheel axis; a threaded coupler configured for threaded engagement with the shaft to couple the hub relative to the wheel; and an elongate member extending along a longitudinal axis from a first end coupled to the hub to a second end spaced from the hub, wherein application of force proximate the second end of the elongate member along a direction angled relative to the longitudinal axis causes the wheel and the wheel axis to pivot.

S: The steering tool of example R, wherein: the wheel comprises a rim secured to the vehicle using one or more fasteners; and the hub contacts the one or more fasteners such that the application of force is transferred to the one or more fasteners to facilitate the pivot of the wheel and the wheel axis.

T: The steering tool of example R or example S, wherein the hub further comprises an alignment feature configured for positioning between a first fastener of the one or more fasteners and a second fastener of the one or more fasteners.

What is claimed is:

1. A manual steering tool for a vehicle, comprising:
   a central hub selectively couplable to a wheel of an autonomous vehicle, the wheel being secured to a shaft that is rotatable about a wheel axis, the central hub comprising:
      a base,
      a clearance hole through the base, the clearance hole being configured to provide a clearance fit over the shaft when the central hub is coupled to the wheel,
      a sidewall extending from the base and defining a bore, and
      one or more holes extending through the sidewall, an individual of the one or more holes extending along a hole axis angled relative to the wheel axis,
   a coupler configured for selectively coupling the central hub to the shaft, the coupler being disposed at least partially in the bore and extending through the clearance hole of the base; and
   an elongate member disposed at least partially in one of the one or more holes, wherein application of a force at a location along the elongate member spaced from the central hub causes the wheel and the wheel axis to pivot relative to the autonomous vehicle.

2. The manual steering tool of claim 1, wherein:
   the wheel comprises a rim that is secured to the autonomous vehicle using one or more fasteners; and
   the central hub contacts the one or more fasteners when the central hub is coupled to the wheel, such that the application of force is transferred to the one or more fasteners.

3. The manual steering tool of claim 2, wherein:
   the central hub comprises a protrusion extending from the base in a direction opposite the sidewall, the protrusion defining a contact surface configured to contact the one or more fasteners.

4. The manual steering tool of claim 1, wherein the wheel comprises a rim that is secured to the autonomous vehicle using a plurality of fasteners spaced circumferentially about the wheel axis, the steering tool further comprising:
an alignment feature extending from the central hub in a direction opposite the sidewall, the alignment feature being configured for placement between adjacent of the plurality of fasteners to locate the central hub relative to the wheel.

5. The manual steering tool of claim 1, wherein the coupler comprises:
a cylindrical body including a thread configured for cooperating with one or more threads on the shaft; and
a flange extending radially from the cylindrical body, the flange being disposed in the bore and extending radially outward a distance sufficient to prohibit the coupler from passing through the clearance hole of the central hub.

6. The manual steering tool of claim 5, wherein the flange is disposed at a first end of the cylindrical body, the coupler further comprising:
a retaining member proximate a second end of the cylindrical body, the retaining member being configured to prevent separation of the coupler from the central hub.

7. A manual steering tool comprising:
a hub;
a coupler configured for selectively coupling the hub relative to a wheel of a vehicle at a position proximate a rim of the wheel; and
an elongate member coupled to the hub, wherein application of a force at a location along the elongate member spaced from the hub causes the wheel to pivot relative to the vehicle.

8. The manual steering tool of claim 7, wherein the hub comprises:
a base,
a clearance hole through the base,
a sidewall extending from the base and defining a bore, and
one or more holes extending through the sidewall, an individual of the one or more holes extending along a hole axis angled relative to a wheel axis about which the wheel rotates.

9. The manual steering tool of claim 8, wherein a first hole of the one or more holes and a second hole of the one or more holes are aligned along the hole axis and the hole axis is substantially normal to the wheel axis.

10. The manual steering tool of claim 9, wherein the coupler is disposed at least partially in the bore and extends through the clearance hole of the base.

11. The manual steering tool of claim 10, wherein the coupler comprises:
a cylindrical body including a thread configured for cooperating with one or more threads on a shaft of the wheel, the shaft being rotatable about the wheel axis; and
a flange extending radially from the cylindrical body, the flange being disposed in the bore and extending radially outward a distance sufficient to prohibit the coupler from passing through the clearance hole of the hub.

12. The manual steering tool of claim 11, wherein the coupler further comprises one or more user engagement surfaces to facilitate threading of the coupler onto the shaft.

13. The manual steering tool of claim 8, wherein the elongate member further comprises a main body and a collar extending radially outward from the main body, the collar being configured to contact the sidewall of the base when the elongate member is inserted into the one or more holes.

14. The manual steering tool of claim 8, wherein:
the wheel comprises a rim that is secured to the vehicle using one or more fasteners; and
the hub comprises a protrusion extending from the base in a direction opposite the sidewall, the protrusion defining a contact surface configured to contact the one or more fasteners.

15. The manual steering tool of claim 7, wherein the rim is secured to the vehicle using a plurality of fasteners spaced circumferentially about a wheel axis, the steering tool further comprising:
an alignment feature extending from the hub, the alignment feature being configured for placement between adjacent of the plurality of fasteners to locate the hub relative to the wheel.

16. The manual steering tool of claim 7, further comprising:
a bearing between the hub and the coupler, the bearing facilitating relative rotation of the hub and the coupler.

17. The manual steering tool of claim 7, wherein the coupler is coupled to the rim associated with the wheel.

18. A steering tool for a vehicle comprising:
a hub selectively securable to a wheel of a vehicle, the wheel being configured to rotate with a shaft about a wheel axis;
a threaded coupler configured for threaded engagement with the shaft to couple the hub relative to the wheel; and
an elongate member extending along a longitudinal axis from a first end coupled to the hub to a second end spaced from the hub,
wherein application of force proximate the second end of the elongate member along a direction angled relative to the longitudinal axis causes the wheel and the wheel axis to pivot.

19. The steering tool of claim 18, wherein:
the wheel comprises a rim secured to the vehicle using one or more fasteners; and
the hub contacts the one or more fasteners such that the application of force is transferred to the one or more fasteners to facilitate the pivot of the wheel and the wheel axis.

20. The steering tool of claim 19, wherein the hub further comprises an alignment feature configured for positioning between a first fastener of the one or more fasteners and a second fastener of the one or more fasteners.

* * * * *